United States Patent [19]
Von Allwörden

[11] Patent Number: 5,768,872
[45] Date of Patent: Jun. 23, 1998

[54] BALER WITH ADJUSTABLE FEED DEVICE

[75] Inventor: Wilhelm Von Allwörden, Oberstotzingen, Germany

[73] Assignee: Same Deutz-Fahr S.p.A., Treviglio, Italy

[21] Appl. No.: 703,005

[22] Filed: Aug. 26, 1996

[30] Foreign Application Priority Data

Aug. 25, 1995 [DE] Germany .................. 195 31 240.6

[51] Int. Cl.⁶ .................................................. A01F 15/04
[52] U.S. Cl. ...................... 56/341; 56/10.2 R; 56/16.4 R; 56/432; 100/88
[58] Field of Search .................. 56/341, 343, 432, 56/436, 437, 10.2 R, 16.4 R, 10.2 G; 100/88, 89

[56] References Cited

U.S. PATENT DOCUMENTS

| | | | |
|---|---|---|---|
| 4,106,268 | 8/1978 | White et al. | 56/341 X |
| 5,165,332 | 11/1992 | Lee | 100/88 |
| 5,226,356 | 7/1993 | Schrag et al. | 100/41 |

FOREIGN PATENT DOCUMENTS 39 13 496   3/1994   Germany .

*Primary Examiner*—Terry Lee Melius
*Attorney, Agent, or Firm*—Hardaway Law Firm P.A.; Charles L. Schwab

[57] ABSTRACT

A baler is provided with a feed device in which the conveying curves of the conveyor rakes are automatically adjusted by actuation of a hydraulic cylinder in response to sensed changes in operating parameters of the baler.

8 Claims, 4 Drawing Sheets

BALER WITH ADJUSTABLE FEED DEVICE

TECHNICAL FIELD

This invention relates to a mobile baler, such as an agricultural baler, which has a feed device which is automatically adjusted to improve bale density.

BACKGROUND AND INFORMATION DISCLOSURE STATEMENT

In German patent document DE 39 13 496, a feed device for a reciprocating plunger type baler is disclosed in which a rotary conveyor, disposed below a baling chamber, is driven by the crank mechanism employed to reciprocate the baling plunger. The rotary conveyor has cam-track-guided conveyor rakes which convey the crop material, synchronously with the movement of the baling plunger, through a feed channel into the baling chamber. A cam track, pivotable about the rotation axis of a rotor body carrying the conveyor rakes, is supported in the region of a side wall and guides the rollers of the conveyor rakes. Coupling members driven by the crank mechanism are pivotally connected to the cam track in such fashion that the tine tips of the conveyor rakes describe an appropriate number of conveying curves for the filling of the feed channel, their position during the filling process being displaced by roughly the thickness of the quantitative portions (a, b, c, etc.) transverse to the direction of conveyance of the material being baled. The tine tips of the conveyor rakes, in performing their conveying function, describe at least one conveying curve.

In terms of design, such a feed device has been proven in practice, but a disadvantage has been uncovered. Since the conveying curves are constant, the quantitative portions a, b, c, etc., differ in size depending on the quantity of the portions conveyed by the conveyor tines. Because of the fluctuating density or volume of these quantitative portions, a varying density of the bale occurs in the subsequent baling operation. These fluctuations in density or volume can result in poor cohesion of the whole bale, and can also impair the storage qualities of the bale.

OBJECTS AND SUMMARY OF THE INVENTION

It is a primary object of the invention to provide a feed device for an agricultural baler which fills the baling chamber with relatively uniform quantitative portions so that the density of the bales is virtually homogeneous.

It is a further object of this invention to provide a feed device as stated in the forgoing primary object wherein the feed device is adjusted automatically in response to the rate of inflow of crop material.

In the baler of this invention, conveyor rakes of the conveying means are connected to the crank mechanism via at least one motion element in such a manner that the motion of the conveying means is variable. By controlling the position of the cam track of the conveying means which guides the conveyor rakes, it is possible to control the quantitative portions conveyed by the conveying means so that the quantitative portions that are fed to the baling chamber have a relatively uniform density.

By feeding relative uniform density portions of crop material to the baling chamber, bales of uniform density, and hence uniform quantity, are produced.

In a preferred embodiment of the invention, a motion transmitting link for changing the position of the cam track of the rotary feed device includes a hydraulic cylinder, the length of which is controllable in dependence on operating parameters of the baler. Since the cam track for the feed device is connected to the baler plunger crank mechanism by a motion transmitting element which includes the hydraulic cylinder, the position of the conveying means can be altered in dependence on the measured or sensed operating parameters of the baler by use of an automatic control mechanism. The volume, the mass and the density of individual quantitative portions are operating parameters. These operating parameters can be supplemented, for example, by the speed of the baler itself, by the speeds of single or multiple components of the baler, as well as other sensed operating conditions.

BRIEF DESCRIPTION OF THE DRAWINGS

One embodiment of the invention is shown in the drawings in which.

DETAILED DESCRIPTION OF THE DRAWINGS

Figure 1:
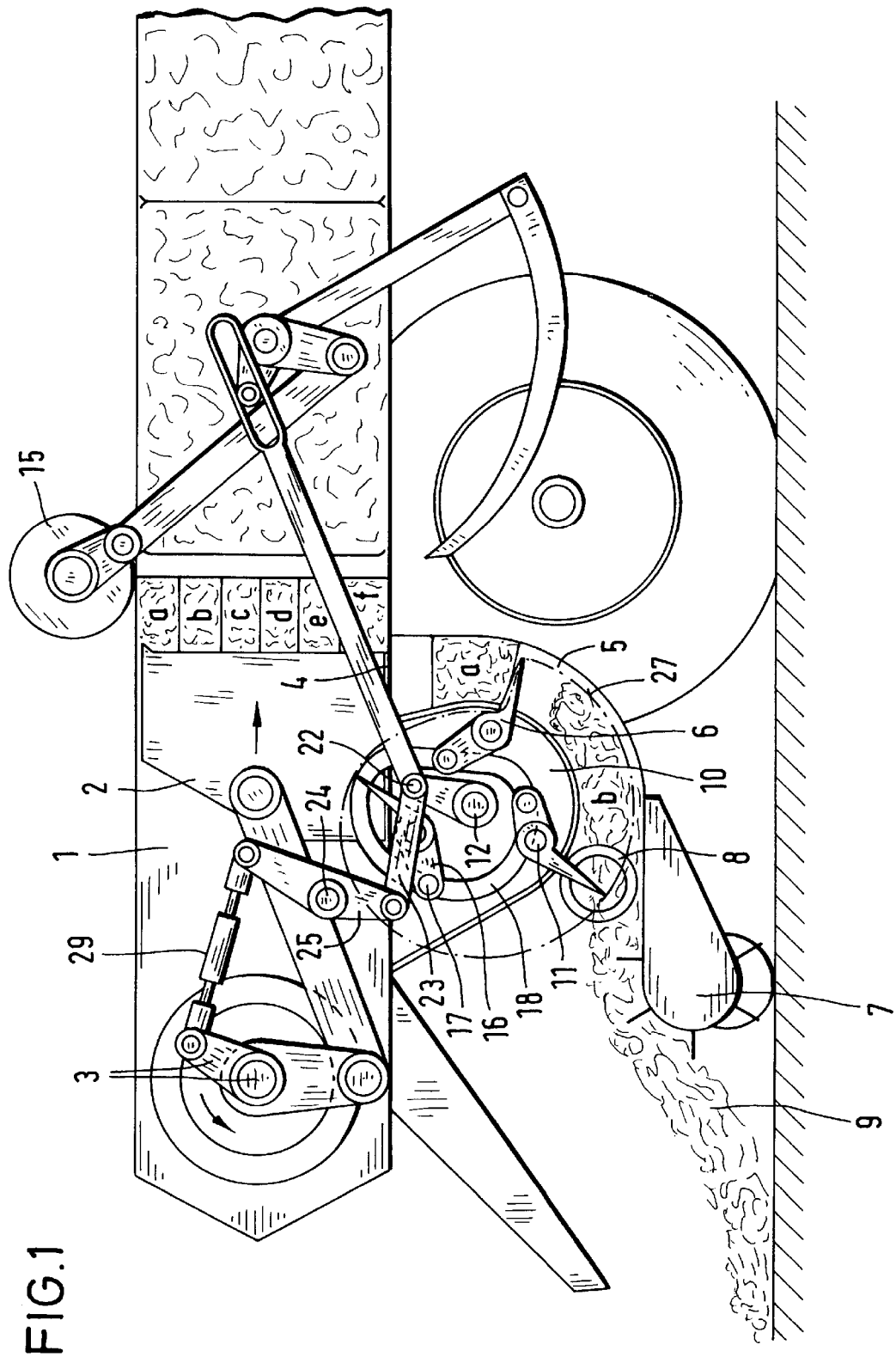
FIGS. 1 through 3 are side views showing the sequence of motion within a baler constructed in accordance with the invention.
Figure 2:
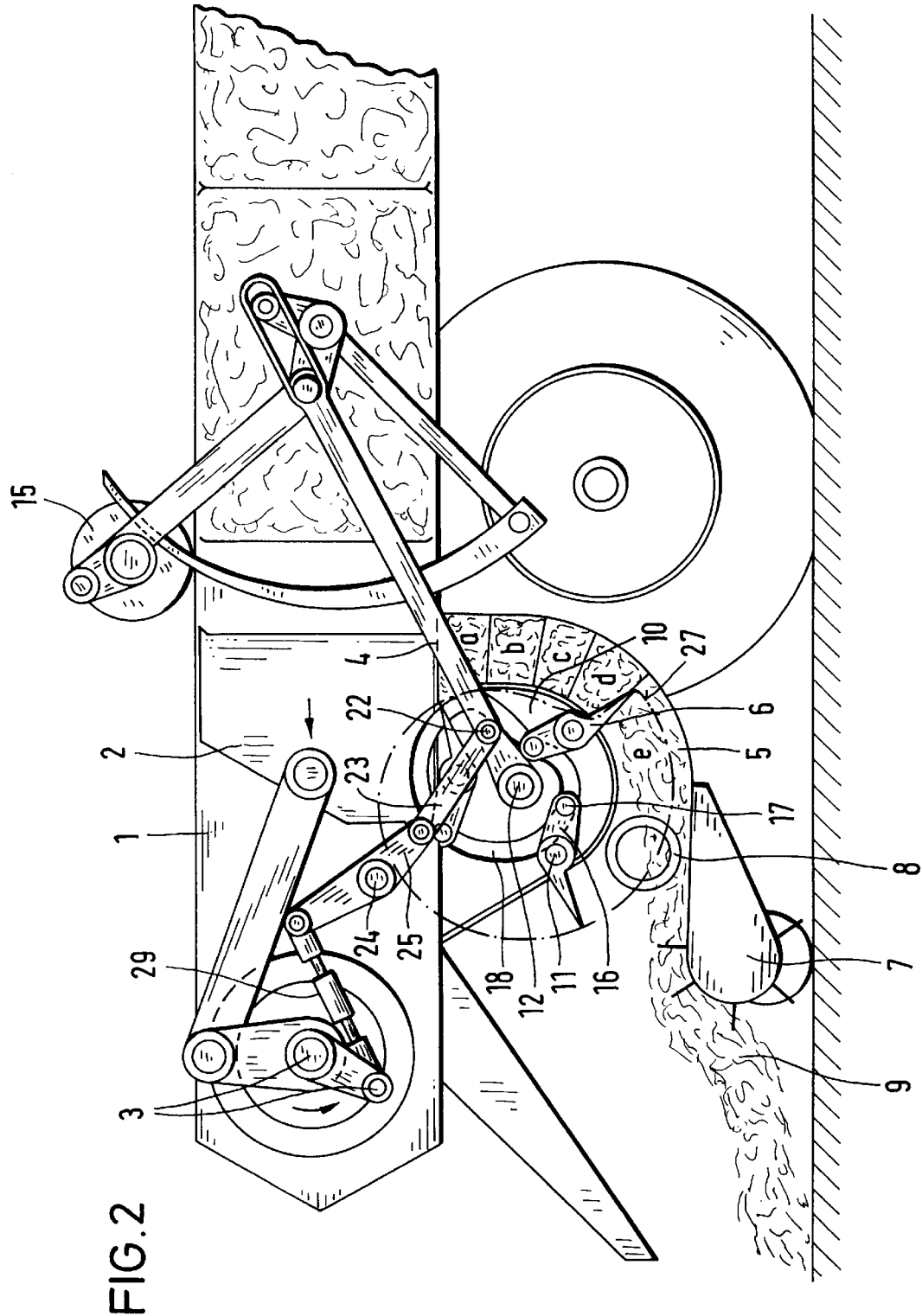
Figure 3:
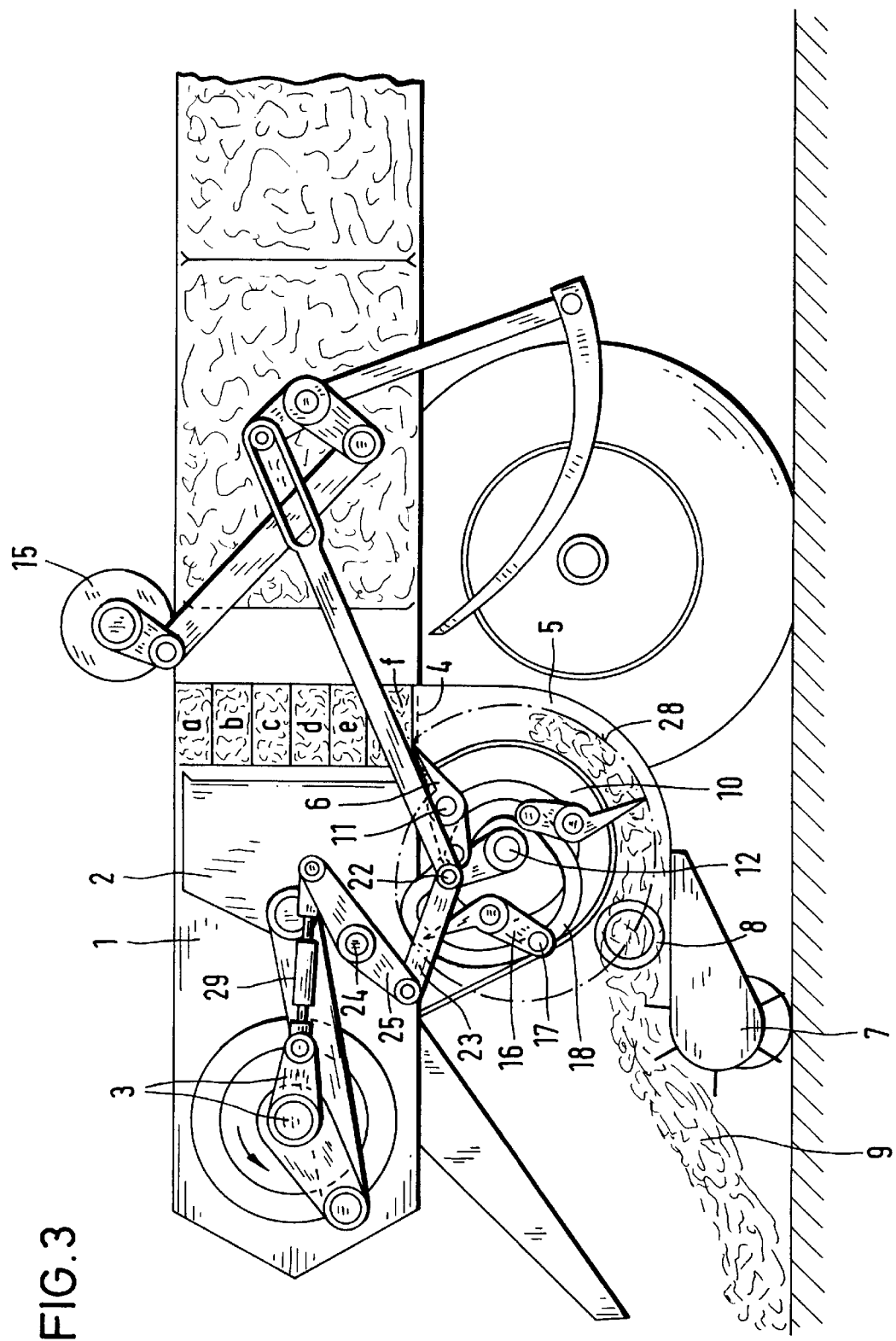

Referring to FIGS. 1, 2, and 3, a baling plunger 2 is reciprocated in a baling chamber 1, in a horizontal plane by a crank mechanism 3. The baling chamber 1 has a charging hole 4, adjacent to which is a feed channel 5. The feed or crop material 9 picked up by a swath pickup 7, and brought together by transverse feed screws 8, is conveyed by conveying means, in the form of conveyor rakes 6 moving in the feed channel 5, to the baling chamber 1. On a rotary body 10, three conveyor rakes 6 are pivotally supported on individual tine shafts 11. The rotary body 10 is attached to a central shaft 12 and with the central shaft is drivable by a bevel-gear drive, not shown, at twice the rotary speed of the crank mechanism 3. A further bevel-gear drive, not shown, driven by the crank mechanism 3 is connected to a binding device 15 arranged on the baling channel 1. The conveyor rakes 6 are pivoted on their respective tine shafts 11 on the rotary body 10 and are guided in a cam track 18 by rollers 17 on the free ends of the swing arms 16. The cam track 18 has its bearing body rotatably supported on the central shaft 12 which in turn is supported by bearings in the side walls of the feed channel 5. The cam track includes a pin 22, to which one end of a motion transmitting element or coupling member 23 is pivotally connected, and whose other end is pivotally connected to a rocker arm 25. The rocker arm 25 is pivotally mounted on the side wall of the feed channel 5 for pivoting about an approximately central pivot pin 24. The rocker arm 25, the hydraulic cylinder 29 and link 23 constitute a motion transmitting apparatus by which the feed device is adjusted.

In accordance with the invention, a hydraulic cylinder 29, controllable via a hydraulic circuit, not shown, is included in the motion transmitting element between the crank mechanism 3 and one end of the rocker arm 25. Alternatively to the arrangement of the hydraulic cylinder 29 between the crank mechanism 3 and the rocker arm 25, the hydraulic cylinder 29 could be a part of the motion transmitting element between one end of the rocker arm 25 and the pin 22 of the rotary body 10, in which event a link rod would interconnect the crank mechanism 3 and the opposite end of the rocker arm 25. In order to increase the degree of adjustment, it is possible to position one hydraulic cylinder 29 between the crank mechanism 3 and the rocker arm 25 and another hydraulic cylinder between the rocker arm 25 and the pin 22. Other actuators for effecting an essentially linear motion are also conceivable in place of the hydraulic cylinder 29.

By this arrangement, the cam track 18 supported on the central shaft 12 is set in an oscillating pivoting motion in dependence on the motion of the crank mechanism 3 and thus on the motion of the baling plunger 2. The tine tips of the conveyor rakes 6 describes an appropriate number of conveying curves 27, modifiable in dependence on operating parameters. The position of the tine tips during the filling process being displaced opposite the conveying direction of the crop material 9 by roughly the thickness of the quantitative portions a, b, c, d, e, f. In order to push the feed or crop material 9 into the baling chamber 1, the tine tips of the conveyor rakes 6 describe at least one conveying curve 28, which, with the baling plunger 2 retracted, extends up to directly in front of the inlet hole 4 and by which means all quantitative portions a, b, c, etc. are pushed into the baling chamber 1. In FIGS. 1 through 3, the rotary body 10 is equipped with three conveyor rakes 6, and it is driven at twice the rotation speed of the crank mechanism 3, so that six quantitative portions a, b, c, d, e and f are created for each stroke of the plunger 1.

Figure 4:
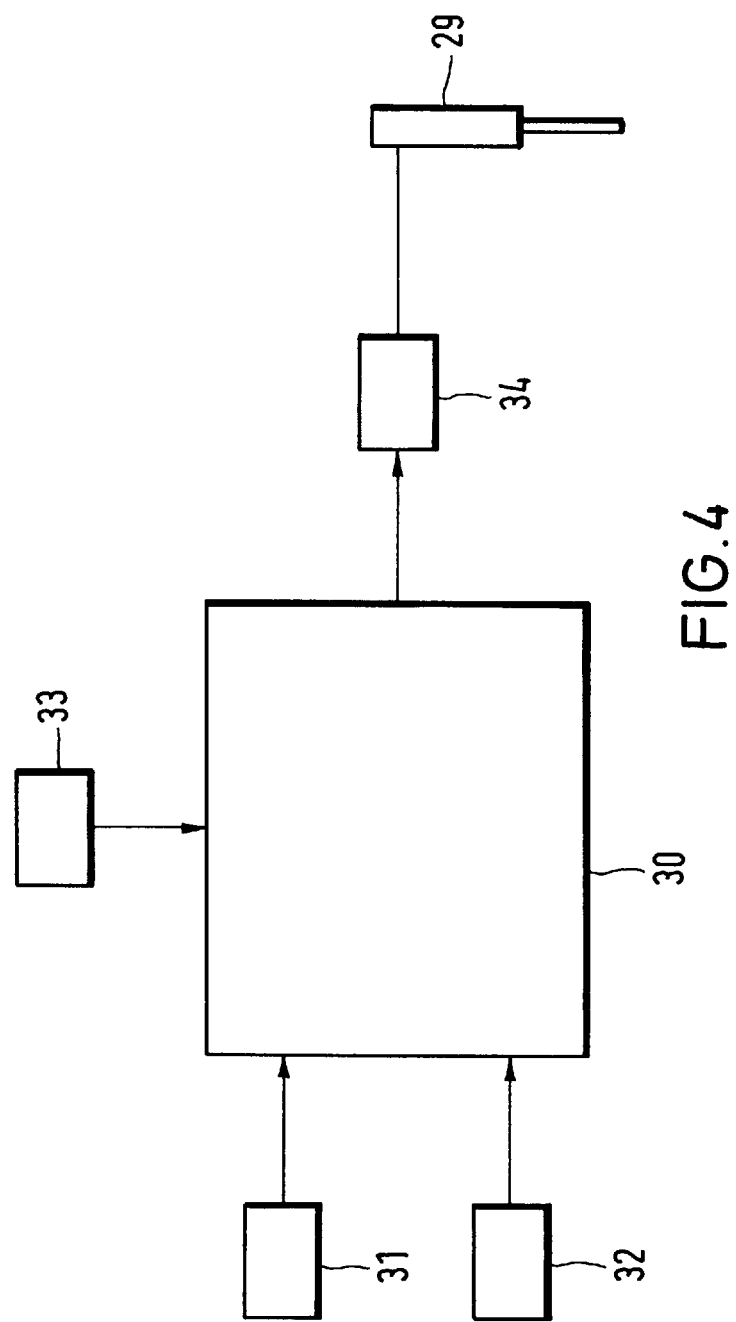
FIG. 4 is a schematic showing of an electronic control mechanism for automatically controlling the sequences of motion of the feed device.

FIG. 4 shows an electronic control mechanism 30 that controls a hydraulic circuit, for operating the cylinder 29. The control mechanism 30, which is a component of the baler, has at least one sensor 31 for measuring the quantity of material conveyed by the conveying means (conveyor rakes 6), the hydraulic cylinder 29 being automatically extended or contracted by a control valve 34 of the hydraulic circuit in dependence on the sensed quantity being conveyed. The position of the conveyor rakes 6 during their motion along their conveying curves is altered by means of the linear motion of the hydraulic cylinder 29 in dependence on the quantity conveyed, so that the quantity conveyed or, respectively, its volume or density remains relatively constant.

The sensor 31 or a further sensor 32 measures the density of the crop material in the baling chamber 1 or, respectively, of the quantitative portions (a, b, c, d, e and/or f). The sensors 31 and 32 may take the form of a pressure sensor. Moreover, it is also conceivable that where the measured quantity to be pressed to too small or too large, a precompression or, respectively, an interruption of the conveying process is performed by means of the swath pickup 7 and/or the transverse feed screw 8. To this end, the control mechanism 30 advantageously has means, not shown, that control the motion of the swath pickup 7 or, respectively, the transverse feed screw 8.

Furthermore, the control mechanism 30 has an input device 33 for inputting setpoint values for various types of crop or other material being baled. This has the advantage that the optimum density to be attained can be set for the type of material being baled, for example agricultural crop material, paper or paperboard.

This invention is particularly useful in large self-propelled balers for agricultural crop materials (such as, for example, straw, hay or silage), but the spectrum of applications is not limited to these, and the invention can be used advantageously in baling other feed material such as paper or refuse for recycling.

What is claimed is:

1. A baler operable to bale agricultural crop material, comprising:
    a baling chamber (1),
    a baling plunger reciprocatable in said baling chamber,
    means operable to reciprocate said baling plunger (2) including a crank mechanism (3) and
    a feed device for conveying feed material to be baled to said baling chamber (1) including a rotary conveyor arranged below said baling chamber (1) and connected in driven relation to said crank mechanism (3), said rotary conveyor conveying said feed material synchronously with the movement of said baling plunger (2), said rotary conveyor including
    a feed channel (5),
    a cam-track (18) and
    a cam-track-guided conveying means having a plurality of conveyor rakes (6) guided by said cam-track,
    said cam-track being connected in driven relation to said crank mechanism (3) by a motion transmitting apparatus including an adjustable length motion transmitting element, said conveyor rakes (6) having tips which, during operation of said baler, define a conveying curve (27, 28),
    the position of said conveying curve (27, 28) being changed by adjustment of said motion transmitting element.

2. The baler of claim 1 wherein said motion transmitting element includes a hydraulic cylinder (29) and further comprising an automatic control means connected in controlling relation to said hydraulic cylinder (29) and operative to control bale density in response to sensing operating parameters of the baler.

3. The baler of claim 1 wherein said motion transmitting apparatus includes a rocker arm (25) pivotally supported on said baler, said rocker arm having one of its ends connected to said crank mechanism (3) by a first motion transmitting element and having the other of its ends connected to said conveying means by a second motion transmitting element, one of said motion transmitting elements being said adjustable length motion transmitting element and including a hydraulic cylinder.

4. The baler of claim 3 wherein said first motion transmitting element includes said hydraulic cylinder.

5. The baler of claim 3 wherein said second motion transmitting means includes said hydraulic cylinder.

6. The baler of claim 1 wherein said motion transmitting apparatus includes a hydraulic cylinder (29) and further comprising an automatic control mechanism (30) connected in controlling relation to said hydraulic cylinder (29) and having at least one sensor (31) for sensing the quantity of feed material being conveyed by said conveying means, said hydraulic cylinder (29) being controlled by said control mechanism in dependence on the quantity of feed material being conveyed.

7. The baler of claim 6 wherein said sensor (31) measures the density of the feed material in the baling chamber (1).

8. The baler of claim 6 wherein said control mechanism (30) includes an input device (33) for selectively inputting setpoint values for various types of baled material.

* * * * *